(12) United States Patent
Tsai

(10) Patent No.: US 11,255,363 B2
(45) Date of Patent: Feb. 22, 2022

(54) POSITIONING FASTENER FOR RETRACTABLE SUPPORT BAR

(71) Applicant: JYIN SHENG CO., LTD., Huatan Township, Changhua County (TW)

(72) Inventor: Yu-Lung Tsai, Huatan Township, Changhua County (TW)

(73) Assignee: JYIN SHENG CO., LTD., Huatan Township, Changhua County (TW)

( * ) Notice: Subject to any disclaimer, the term of this patent is extended or adjusted under 35 U.S.C. 154(b) by 314 days.

(21) Appl. No.: 16/592,162

(22) Filed: Oct. 3, 2019

(65) Prior Publication Data

US 2020/0124073 A1 Apr. 23, 2020

(30) Foreign Application Priority Data

Oct. 18, 2018 (TW) ................................ 107136742

(51) Int. Cl.
 *F16B 7/10* (2006.01)
(52) U.S. Cl.
 CPC .................................. *F16B 7/105* (2013.01)
(58) Field of Classification Search
 CPC .... F16B 7/105; F16B 7/10; B60R 2011/0084; E21D 15/14; D21D 15/46; A47C 3/26; F16M 11/28; F16M 11/26; E04G 11/483
 See application file for complete search history.

(56) References Cited

U.S. PATENT DOCUMENTS

| | | | | | |
|---|---|---|---|---|---|
| 2,849,249 | A | * | 8/1958 | Fridolph | F16B 7/1454 403/376 |
| 5,947,666 | A | * | 9/1999 | Huang | B60P 7/15 410/151 |
| 6,247,882 | B1 | | 6/2001 | Huang | |
| 7,290,742 | B2 | * | 11/2007 | Wang | A45B 7/005 135/16 |
| 7,950,615 | B2 | * | 5/2011 | Lu | F16B 7/14 248/354.1 |
| 8,162,280 | B2 | * | 4/2012 | Yu | F16M 11/06 248/354.7 |
| 8,202,029 | B2 | * | 6/2012 | Chou | B60P 7/15 410/143 |
| 8,490,930 | B2 | * | 7/2013 | Huang | B60P 7/15 248/125.2 |
| 10,890,201 | B2 | * | 1/2021 | Tsai | F16B 7/105 |

FOREIGN PATENT DOCUMENTS

TW 553332 U 9/2003

* cited by examiner

*Primary Examiner* — Anita M King
(74) *Attorney, Agent, or Firm* — Muncy, Geissler, Olds & Lowe, P.C.

(57) ABSTRACT

A positioning fastener pivotally connected to a mount of a retractable support bar for locking the connection state of an inner tube and an outer tube is disclosed to include a casing that has an actuating segment and a finger grip, a protective member made of metal and connected to the actuating segment and having a latching portion for selectively engaging in one of a series of holes on the inner tube, a pin rod inserted through the casing and the protective member, and a pivot device, which includes a pivotally inserted through the casing and the protective member and a torsion spring mounted on the pivot shaft.

9 Claims, 5 Drawing Sheets

POSITIONING FASTENER FOR RETRACTABLE SUPPORT BAR

BACKGROUND OF THE INVENTION

1. Field of the Invention

The present invention relates to a positioning fastener for retractable support bar and more particular, to a positioning fastener that has a long service life.

2. Description of the Related Art

Taiwan Patent No. 553332 discloses an improved retractable support bar positioning structure, which comprises an inner tube and an outer tube coupled together. The outer end of the outer tube and the outer end of the inner tube are respectively provided with a foot member. The foot members can be stopped between two planes (between the ceiling and the ground, or between two walls). The inner tube has a plurality of holes spaced along the length. A mount is disposed at a pivotal connection between the inner tube and the outer tube. An elastic button is mounted on the mount. The head of the elastic button can be engaged into one hole of the inner tube to lock the combined length of the inner tube and the outer tube. The positioning fastener on the retractable support bar can be used for the hanging or an object (bike or other) to provide support.

The connection between the inner and outer tubes of the above-mentioned retractable support bar is locked by means of engaging the head of the elastic button into one hole of the inner tube. Under the elastic button, there is a safety ejector and a shrapnel. The top of the safety ejector pin is placed between the elastic button and the spring leaf to provide an insurance function that prevents the elastic button from being pulled. When the elastic button is pressed, the head of the elastic button is detached from the hole of the inner tube and the inner tube is unlocked, allowing the inner tube to be retracted downward into the outer tube due to gravity. At this time, if the user no longer presses the elastic button, the elastic button will press the head into one hole of the inner tube to lock the inner tube to the outer tube. However, since the elastic button is an aluminum extruded structure, if the inner tube drops at a very fast speed, the impulse can break the head of the elastic button, causing a locking problem, which in turn causes the retractable support bar to be unable to locate.

SUMMARY OF THE INVENTION

The present invention has been accomplished under the circumstances in view. It is the main object of the present invention to provide a positioning fastener for retractable support bar, which uses a protective member having a high strength structural property that provides better impact resistance to prolong the service life of the positioning fastener.

It is another object of the present invention to provide a positioning fastener for retractable support bar, which uses a protective member having a high strength structural property that is inexpensive to manufacture and facilitates replacement.

To achieve these and other objects of the present invention, a positioning fastener for retractable support bar is pivotally connected to a mount. The mount is disposed at a pivotal connection between an inner tube and outer tube. The inner tube is movable in and out of the outer tube, having a plurality of holes for the engagement of the positioning fastener to lock the inner tube and the outer tube in position. The positioning fastener comprises a casing, a protective member, a pin rod, and a pivot device. The casing is shaped like a long handle, comprising an actuating segment, a mounting hole, a through hole and a finger grip. The actuating segment and the finger grip are located at two opposite ends of the casing. The mounting hole and the through hole are located between the actuating segment and the finger grip. The mounting hole and the through hole are both disposed along the width direction of the casing. The protective member is connected to the actuating segment of the casing, comprising an intermediate panel and two opposite side panels respectively extending from two opposite sides of the intermediate panel. The intermediate panel and the two side panels are encircled to form a concave space for accommodating the actuating segment of the casing. The intermediate panel comprises a latching portion. The latching portion and the concave space are located on two opposite sides of the intermediate panel. The latching portion is forced to engage into one of the holes of the inner tube when the actuating segment is biased in direction toward the inner tube. Each of the two side panels are provided with a first hole and a second hole. Each first hole corresponds to the mounting hole of the casing. Each second hole corresponds to the through hole of the casing. The pin rod is inserted through the first holes of the two side panels of the protective member and the mounting hole of the casing. The pivot device comprises a pivot shaft and a torsion spring. The torsion spring is mounted in the through hole of the casing. The pivot shaft is inserted through a through hole on each of two opposite support panels of the mount, the second holes of the two side panels of the protective member, the torsion spring and the through hole of the casing to pivotally connect the positioning fastener to the mount so that the positioning fastener is turnable about the pivot shaft in direction toward or away from the inner tube. The elastic force of the torsion spring keeps the actuating segment toward the inner tube.

Thereby, the positioning fastener of the present invention further comprises a protective member having a high-strength structural characteristic, and the latching portion for positioning the inner tube hole is provided on the protective member, so that the latching portion has high strength and provides better impact resistance, giving the positioning fastener a long service life. In addition, it also saves manufacturing costs and is easy to replace.

Other advantages and features of the present invention will be fully understood by reference to the following specification in conjunction with the accompanying drawings, in which like reference signs denote like components of structure.

DETAILED DESCRIPTION OF THE INVENTION

Figure 1:
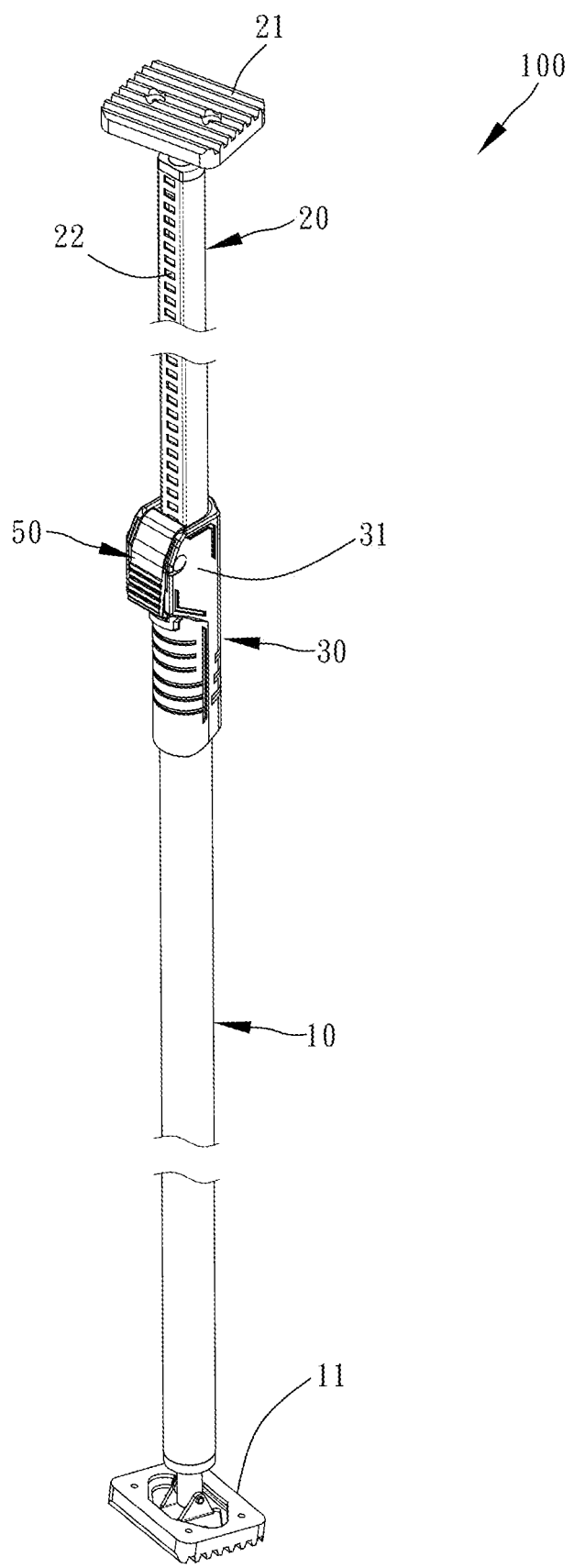
FIG. 1 is an oblique top elevational view of a retractable support bar using a positioning fastener in accordance with the present invention.
Figure 2:
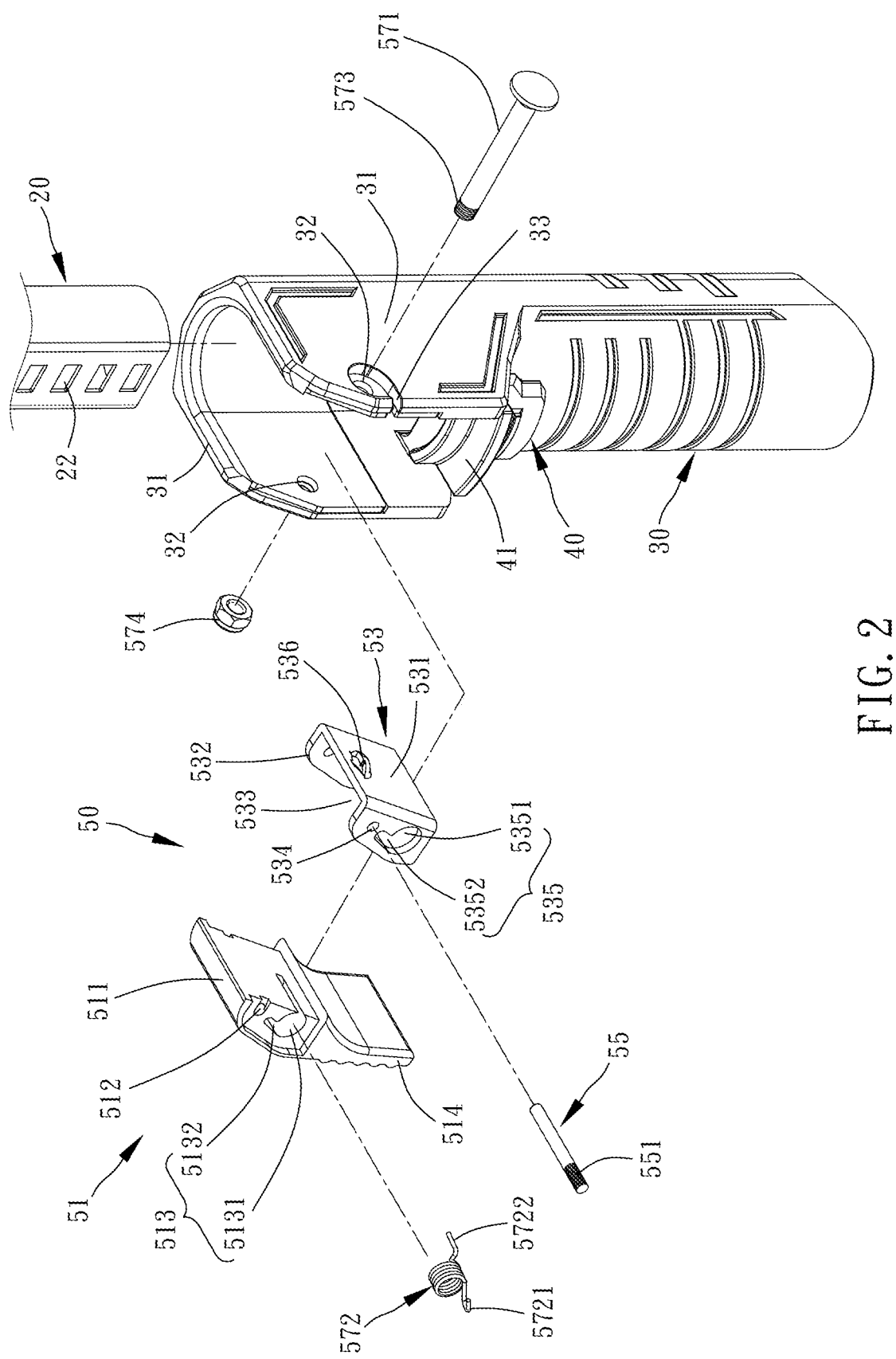
FIG. 2 is an exploded view of the positioning fastener in accordance with the present invention.
Figure 3:
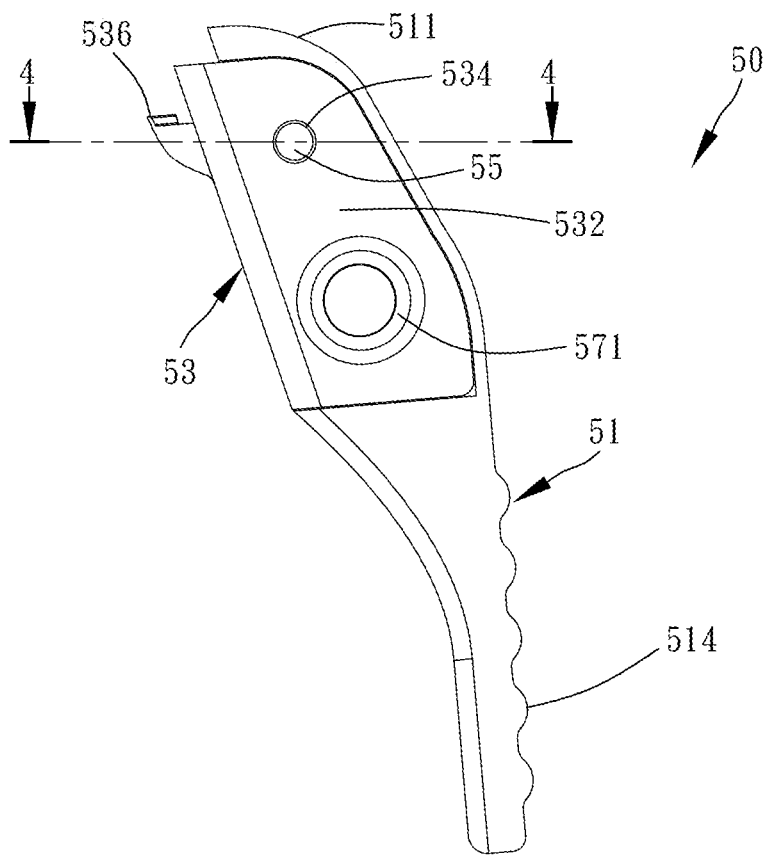
FIG. 3 is a schematic side view of the positioning fastener in accordance with the present invention.
Figure 4:
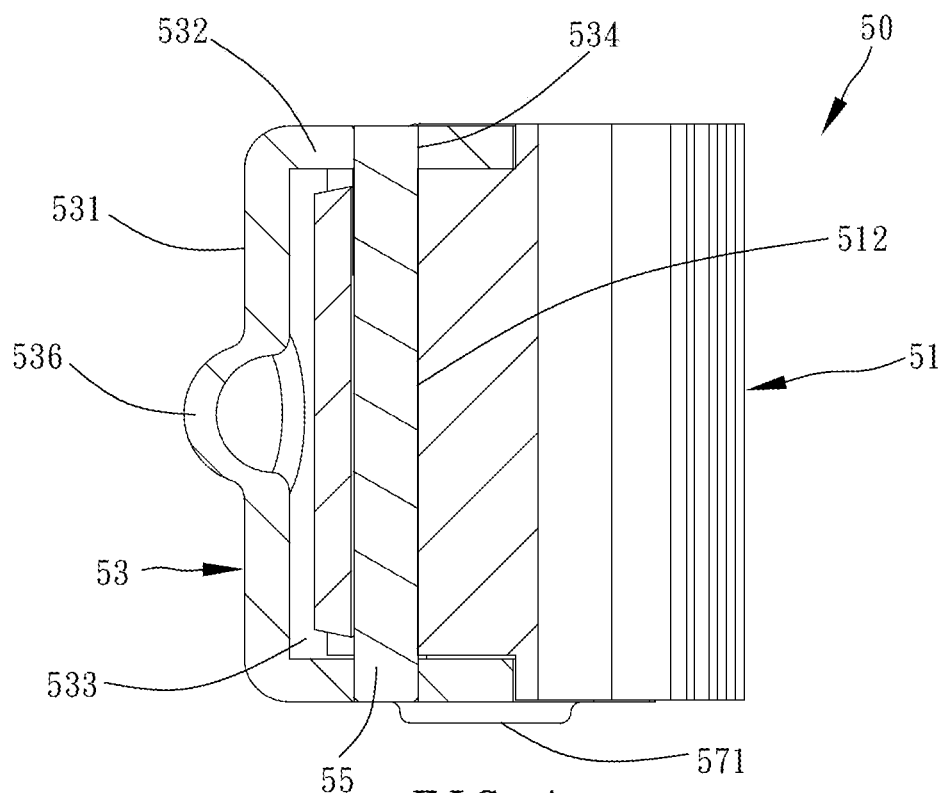
FIG. 4 is a sectional view taken along line 4-4 of FIG. 3.

Referring to FIGS. 1-4, a positioning fastener 50 for retractable support bar in accordance with the present invention mainly comprises a casing 51, a protective member 53, a pin rod 55 and a pivot device 57.

The casing 51 is shaped like a long handle, having an actuating segment 511, a mounting hole 512, a through hole 513 and a finger grip 514. The actuating segment 511 and the finger grip 514 are located at two opposite ends of the casing 51. The mounting hole 512 and the through hole 513 are located between the actuating segment 511 and the finger grip 514. The mounting hole 512 and the through hole 513 are both disposed along the width direction of the casing 51. The mounting hole 512 is used for the insertion of the pin rod 55. The through hole 513 comprises a circular hole 5131 and a receiving groove 5132. The receiving groove 5132 is disposed outside the circumference of the circular hole 5131 and communicates with the circular hole 5131.

The protective member 53 is attached to the actuating segment 511 of the casing 51. The protective member 53 is made of high-strength metal (iron, steel, alloy steel, etc.). The protective member 53 comprises an intermediate panel 531 and two opposite side panels 532 respectively extending from two opposite sides of the intermediate panel 531. The intermediate panel 531 and the two side panels 532 are encircled to form a concave space 533. The actuating segment 511 of the casing 51 can be accommodated in the concave space 533. Each of the two side panels 532 is provided with a first hole 534 and a second hole 535. Each of the first holes 534 corresponds to the mounting hole 512 of the casing 51. Each of the second holes 535 corresponds to the through hole 513 of the casing 51. Each of the second holes 535 is composed of a large hole portion 5351 and a small hole portion 5352 which are connected to each other. The large hole portion 5351 has the same diameter as the circular hole 5131. The diameter of the small hole portion 5352 is the same as the width of the receiving groove 5132. The intermediate panel 531 has a latching portion 536. The latching portion 536 and the concave space 533 are located on two opposite sides of the intermediate panel 531. In the present preferred embodiment of the present invention, the protective member 53 can be formed by a sheet metal forming process, and the latching portion 536 is formed directly by the intermediate panel 531 by stamping, and the latching portion 536 has a curved convex shape on the intermediate panel 531.

The pin rod 55 is a circular rod member, and the pin rod 55 is provided with a plurality of ridges 551 on the peripheral surface of one end thereof, which can increase the friction between the pin rod 55 and the mounting hole 512 to provide better connection effect.

The pivot device 57 comprises a pivot shaft 571 and a torsion spring 572. The torsion spring 572 is mounted in the through hole 513. The torsion spring 572 has a hook portion 5721 at one end thereof and a curved portion 5722 at an opposite end thereof. The torsion spring 572 is mounted in the through hole 513 of the casing 51 by inserting the curved portion 5722 through the small hole portion 5352 of the protective member 53 into the receiving groove 5132 to let the hook portion 5721 be extended outside the through hole 513.

The structure of the present invention has been described above, and the present invention must be assembled to a retractable support bar 100 before use.

As illustrated in FIG. 1, the retractable support bar 100 comprises an outer tube 10, an inner tube 20, a mount 30 and a locking member 40. The positioning fastener 50 of the present invention is pivotally connected to the mount 30 for positioning the assembled state of the inner tube 20 and the outer tube 10. The locking member 40 can lock the positioning fastener 50 and prevent the positioning fastener 50 from being accidentally moved, preventing the inner tube 20 from falling in the absence of warning, which may cause pinching or hitting people.

Figure 5:
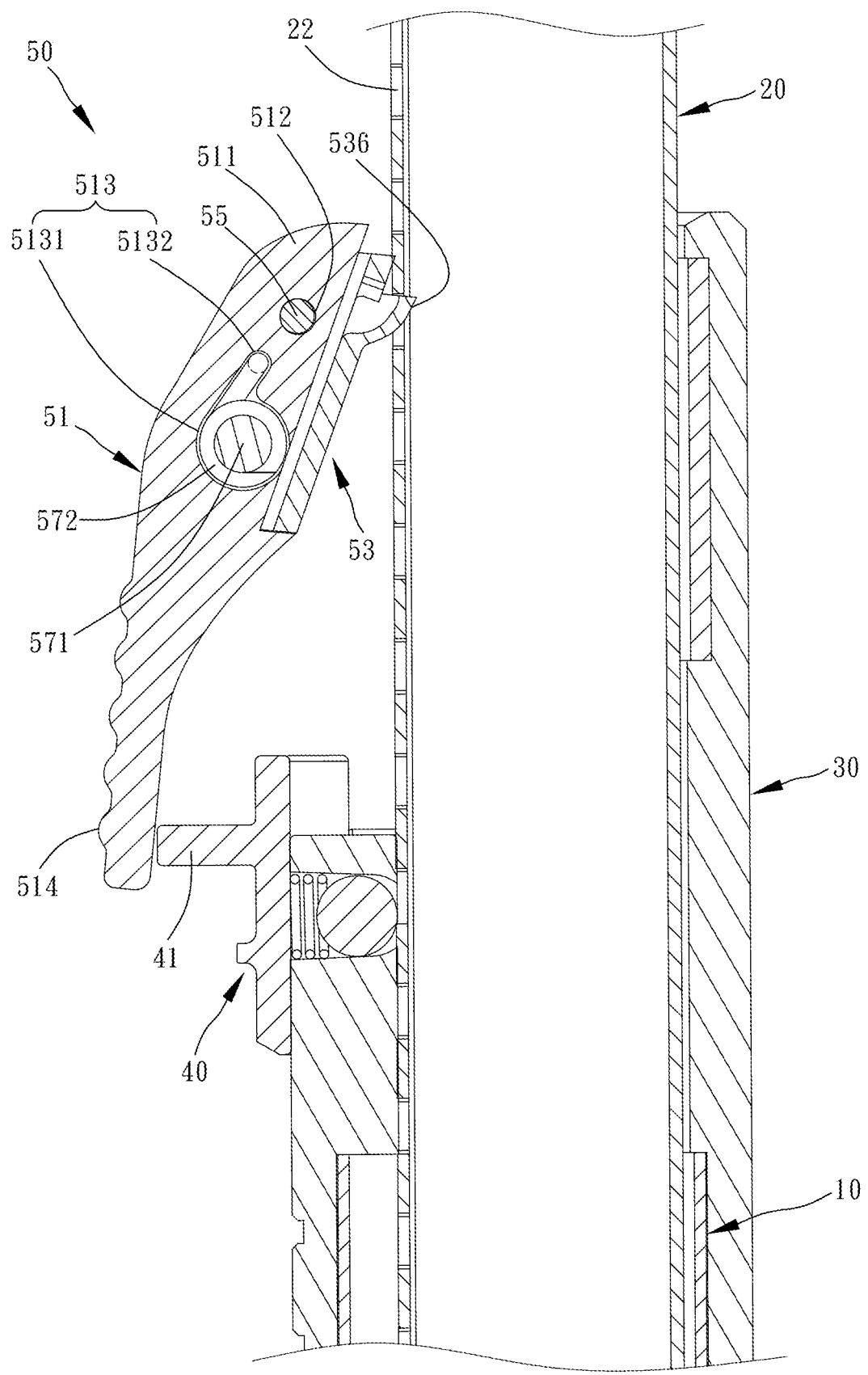
FIG. 5 is a schematic sectional view of the present invention, illustrating the positioning fastener used with a first form of locking member.

The outer end of the outer tube 10 and the outer end of the inner tube 20 are respectively provided with a foot member 11 or 21. The foot members 11 and 21 can be respectively placed on the ceiling and the ground, or respectively placed between the upper and lower objects that can be abutted. The inner tube 20 has a plurality of hole 22. The mount 30 is disposed at a pivotal connection between the inner tube 20 and the outer tube 10, having two support panels 31 respectively located at two opposite sides thereof. Each of the support panels 31 is provided with a through hole 32. One of the support panels 31 is provided with a slot 33 that extends inwardly from the edge of the support panel 31. The slot 33 is connected to the through hole 32 on the respective support panel 31. The locking member 40 is a sliding block (as shown in FIG. 5) movably disposed on the mount 30. The sliding block has a locking piece 41 placed to or not to stop against the positioning fastener 50 of the present invention according to its moving position. The foregoing structure of the inner tube 20, the outer tube 10, the foot members 11 and 21, the mount 30 and the locking member 40 is not the main feature of the present invention but is for convenience of explaining the operational state of the positioning fastener 50 of the present invention. I will not repeat them.

With the above structure, when assembling the positioning fastener 50, the concave space 533 of the protective member 53 is used for accommodating the actuating segment 511 of the casing 51, the first hole 534 on the protective member 53 is aimed at the mounting hole 512 of the casing 51, the second hole 535 on the protective member 53 is aimed at the through hole 513 of the casing 51, the pin rod 55 is inserted through the first holes 534 and the mounting hole 512, the pivot shaft 571 is inserted through the through holes 32 of the two support panels 31 of the mount 30, the second holes 535 of the two side panels 532, the torsion spring 572 and the through hole 513 of the casing 51, and then a nut 574 is tightly fastened the outer thread 573 of the pivot shaft 571, and then the hook portion 5721 of the torsion spring 572 that extends out of the through hole 513 of the casing 51 is turned and hooked in the slot 33.

The positioning fastener 50 of the present invention is pivotally connected to the mount 30 and can be turned about the pivot shaft 571 in direction toward or away from the inner tube 20. The elastic force of the torsion spring 572 keeps the actuating segment 511 facing towards the inner tube 20.

To adjust the length of the retractable support bar 100, the user presses the finger grip 514 to pivot the actuating segment 511 away from the inner tube 20, and the latching portion 536 leaves the hole 22 to unlock the inner tube 20. At this point, the inner tube 20 can be moved to adjust the retractable support bar 100 to the appropriate length. After reaching the length required by the user, the user can release the finger grip 514 without pressing. Due to the effect of the torsion spring 572, the actuating segment 511 is moved to the inner tube 20 again, and the latching portion 536 is engaged into one of the holes 22 of the inner tube 20.

To lock, since the position of the finger grip 514 at this time is away from the mount 30, the user simply pushes the locking member 40 so that the locking piece 41 protrudes under the finger grip 514 and is abutted against the finger grip 514. As a result, the positioning fastener 50 of the present invention cannot be pivoted, and the latching portion 536 cannot leave the engaged through hole 32, thereby locking the pivotal connection of the inner tube 20 and the outer tube 10. Thus, the setting of the retractable support bar 100 is completed.

The latching portion 536 of the locating fastener 50 of the present invention is attached to the protective member 53 which is made of high-strength metal and has better structural strength and impact resistance.

If the latching portion 536 that faces towards the holes 22 of the inner tube 20 comes into contact or collides with the lowered inner tube 20 when the user no longer presses the finger grip 514, with the impact resistance of the protective member 53, the positioning fastener 50 of the present invention can be not broken and provides a long service life.

Moreover, the casing 51 of the positioning fastener 50 of the present invention can be made of a plastic which is generally inexpensive in material cost, and only the protective member 53 is made of a metal material such as iron, steel or alloy steel having a high material cost, which can save manufacturing cost. Moreover, when the latching portion 536 of the positioning fastener 50 of the present invention is broken or deformed to affect its positioning effect, the pin rod 55 and the pivot device 57 can also be taken out, and a new protective member 53 can be replaced. Thereby, the present invention can indeed save manufacturing costs, and the protective member 53 can be easily replaced, accurately achieving the expected purpose of the invention.

Figure 6:
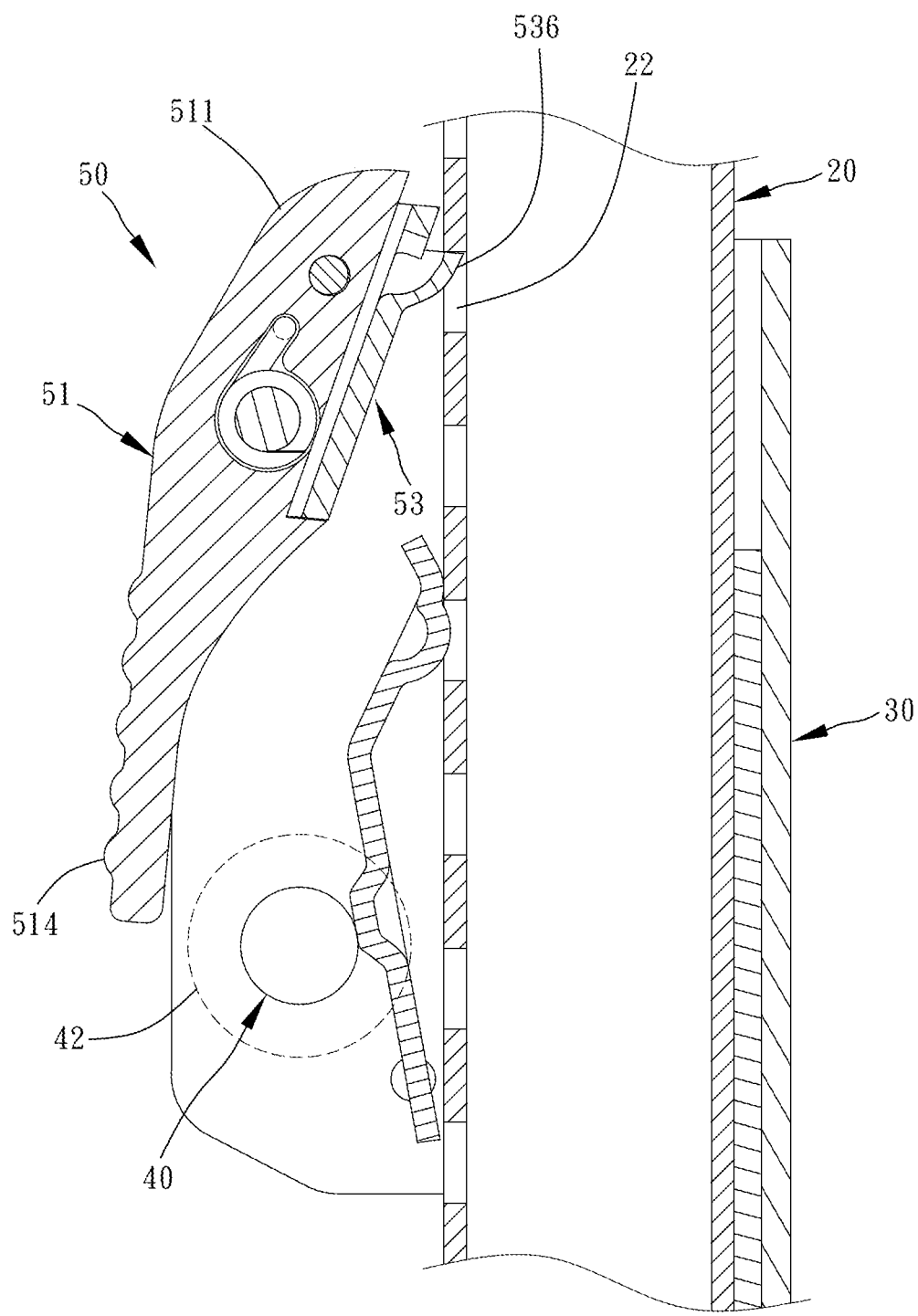
FIG. 6 is a schematic sectional view of the present invention, illustrating the positioning fastener used with a second form of locking member.

Referring to FIG. 6, the locking member for locking the positioning fastener 50 to the retractable support bar is not limited to the above-mentioned form, and the positioning fastener 50 can also be combined with another locking member 40. It is the same as the operation principle and steps of the embodiment described in FIG. 5, and the difference lies in: The locking member 40 is a round rod. When the combined length of the inner tube 20 and the outer tube 10 is adjusted, the actuating segment 511 of the positioning fastener 50 of the present invention is biased in direction toward the inner tube 20, the latching portion 536 is engaged into one hole 22 of the inner tube 20, the finger grip 514 is biased in direction away from the mount 30, and the locking member 40 is pushed to move its large diameter portion 42 into abutment against the finger grip 514 to prohibit the positioning fastener 50 from being pivoted. Thus, the setting of the retractable support bar 100 is completed.

What is claimed is:

1. A positioning fastener for retractable support bar, said positioning fastener being pivotally connected to a mount, said mount being disposed at a pivotal connection between an inner tube and outer tube, said inner tube being movable in and out of said outer tube, said inner tube having a plurality of holes for the engagement of said positioning fastener to lock said inner tube and said outer tube in position, said positioning fastener comprising:

a casing shaped like a long handle, said casing comprising an actuating segment, a mounting hole, a through hole and a finger grip, said actuating segment and said finger grip being located at two opposite ends of said casing, said mounting hole and said through hole being located between said actuating segment and said finger grip, said mounting hole and said through hole being both disposed along the width direction of said casing;

a protective member connected to said actuating segment of said casing, said protective member comprising an intermediate panel and two opposite side panels respectively extending from two opposite sides of said intermediate panel, said intermediate panel and said two side panels being encircled to form a concave space for accommodating said actuating segment of said casing, said intermediate panel comprising a latching portion, said latching portion and said concave space being located on two opposite sides of said intermediate panel, said latching portion being forced to engage into one of said holes of said inner tube when said actuating segment is biased in direction toward said inner tube, each of said two side panels being provided with a first hole and a second hole, each said first hole corresponding to said mounting hole of said casing, each said second hole corresponding to said through hole of said casing;

a pin rod inserted through said first holes of said two side panels of said protective member and said mounting hole of said casing; and a pivot device comprising a pivot shaft and a torsion spring, said torsion spring being mounted in said through hole of said casing, said pivot shaft being inserted through a through hole on each of two opposite support panels of said mount, said second holes of said two side panels of said protective member, said torsion spring and said through hole of said casing to pivotally connect said positioning fastener to said mount so that said positioning fastener is turnable about said pivot shaft in direction toward or away from said inner tube, the elastic force of said torsion spring keeping said actuating segment toward said inner tube.

2. The positioning fastener for retractable support bar as claimed in claim 1, wherein said protective member is selectively made of iron, steel, or alloy steel material.

3. The positioning fastener for retractable support bar as claimed in claim 2, wherein said latching portion has a curved convex shape on said intermediate panel.

4. The positioning fastener for retractable support bar as claimed in claim 1, wherein said pin rod is provided with a plurality of ridges on the side peripheral surface of one end thereof.

5. The positioning fastener for retractable support bar as claimed in claim 1, wherein said pivot shaft of said pivot device has an outer thread located on a distal end thereof, said outer thread being fastened up with a nut after said pivot shaft is inserted through a through hole on each of two opposite support panels of said mount, said second holes of said two side panels of said protective member, said torsion spring and said through hole of said casing.

6. The positioning fastener for retractable support bar as claimed in claim 1, wherein said through hole of said casing comprises a circular hole and a receiving groove, said receiving groove being disposed outside the circumference of said circular hole and communicating with said circular hole;

said second hole is composed of a large hole portion and a small hole portion, said large hole portion having the same diameter as said circular hole, the diameter of said small hole portion being the same as the width of said receiving groove; said torsion spring has one end thereof terminating in a hook portion and an opposite end thereof terminating in a curved portion; said mount comprises two support panels respectively located at two opposite sides thereof, each said support panel being provided with a through hole, one said support panels being provided with a slot, said slot being inwardly extended from a edge of the respective said support panel and connected to the said through hole on the respective said support panel; said inner tube is disposed between said two support panels of said mount; said curved portion of said torsion spring being inserted into said small hole portion that is aimed at said receiving groove, said hook portion being extended out of said through hole of said casing and used to hook in said slot.

7. The positioning fastener for retractable support bar as claimed in claim 1, wherein said positioning fastener is used with a locking member being mounted on said mount, said locking member being adapted for abutting against said finger grip of said casing.

8. The positioning fastener for retractable support bar as claimed in claim 7, wherein said locking member is a round rod pivotally mounted in said mount below said finger grip, said round rod having a large diameter portion and a small diameter portion.

9. The positioning fastener for retractable support bar as claimed in claim 7, wherein said locking member is a sliding block, said sliding block comprising a locking piece, said sliding block being mounted on said mount and movable relative to said mount being a first position to abut against said finger grip and a second position to release said finger grip.

* * * * *